US011968982B2

(12) United States Patent
Cadle-Davidson

(10) Patent No.: US 11,968,982 B2
(45) Date of Patent: Apr. 30, 2024

(54) CORN ROOTWORM BIOLOGICAL CONTROL

(71) Applicant: Agrauxine Corp., Milwaukee, WI (US)

(72) Inventor: Molly Cadle-Davidson, Geneva, NY (US)

(73) Assignee: Agrauxine Corp., Milawaukee, WI (US)

( * ) Notice: Subject to any disclaimer, the term of this patent is extended or adjusted under 35 U.S.C. 154(b) by 0 days.

(21) Appl. No.: 17/516,875

(22) Filed: Nov. 2, 2021

(65) Prior Publication Data

US 2022/0142175 A1 May 12, 2022

Related U.S. Application Data

(60) Provisional application No. 63/110,665, filed on Nov. 6, 2020.

(51) Int. Cl.
*A01N 63/30* (2020.01)
*A01P 7/04* (2006.01)

(52) U.S. Cl.
CPC ............... *A01N 63/30* (2020.01); *A01P 7/04* (2021.08)

(58) Field of Classification Search
CPC ........ A01N 63/30; A01N 63/38; A01N 25/00; A01P 7/04
See application file for complete search history.

(56) References Cited

U.S. PATENT DOCUMENTS

| | | |
|---|---|---|
| 2013/0071425 A1 | 3/2013 | Vidal et al. |
| 2020/0022375 A1 | 1/2020 | Harman et al. |
| 2020/0170259 A1* | 6/2020 | Cadle-Davidson .... A01N 63/38 |

OTHER PUBLICATIONS

ARSEF ARS Collection of Entomopathogenic Fungal Cultures 2011 (Year: 2011).*
Meyling et al., "Diversity of *Beauveria* spp. isolates from pollen beetles Meligethes aeneus in Switzerland", J Invertebrate Pathology, vol. 109, Issue 1, Jan. 2012, pp. 76-82 (Year: 2012).*
Mulock, Barbara S., et al.; Effect of Beauveria bassiana on the Fecundity of Western Corn Rootworm, Diabrotica virgifera virgifera (Coleoptera: Chrysomelidae); Biological Control; Apr. 19, 2001 (6 pages).
Pilz, C., et al.; Selection of entomopathogenic fungi for the control of the western corn rootworm Diabrotica virgifera virgifera; Journal of Applied Entomology; Mar. 2, 2007 (6 pages).
Keyser, Chad A., et al.; Metarhizium seed treatment mediates fungal dispersal via roots and induces infections in insects; Fungal Ecology II; Jun. 27, 2014 (10 pages).
Written Opinion & International Search Report for PCT/US2021/057806 dated Feb. 28, 2022 (9 pages).
Preliminary Report on Patentabiltiy for PCT/US2021/057806 dated May 19, 2023 (6 pages).

* cited by examiner

*Primary Examiner* — Ruth A Davis
(74) *Attorney, Agent, or Firm* — Reising Ethington P.C.

(57) ABSTRACT

Disclosed is a method for controlling corn rootworm damage to corn comprising the step of applying to a corn seed from $10^3$ to $10^6$ colony forming units of one of *Beauveria bassiana* strain ARSEF 2579 (BF503), *Metarhizium pingshaence* strain ARSEF 5197 (BF517) or mixtures thereof. Another aspect of the present disclosure comprises further combining either BF503 or BF517 with the fungi *Trichoderma afroharzianum* strain K2 (ATCC PTA-9708) plus *Trichoderma atroviride* strain K4 (ATCC PTA 9707) and applying it to corn seeds. Another aspect of the present disclosure comprises applying at least one of the BF503 or BF517 to a field planted with corn, with the fungi applied into the seed zone. In another aspect of the present disclosure the same field is further treated with both *Trichoderma afroharzianum* strain K2 (ATCC PTA-9708) plus *Trichoderma atroviride* strain K4 (ATCC PTA 9707) into the seed zone.

8 Claims, 17 Drawing Sheets

Hyphae outgrowth on the corn roots

Figure 1A:
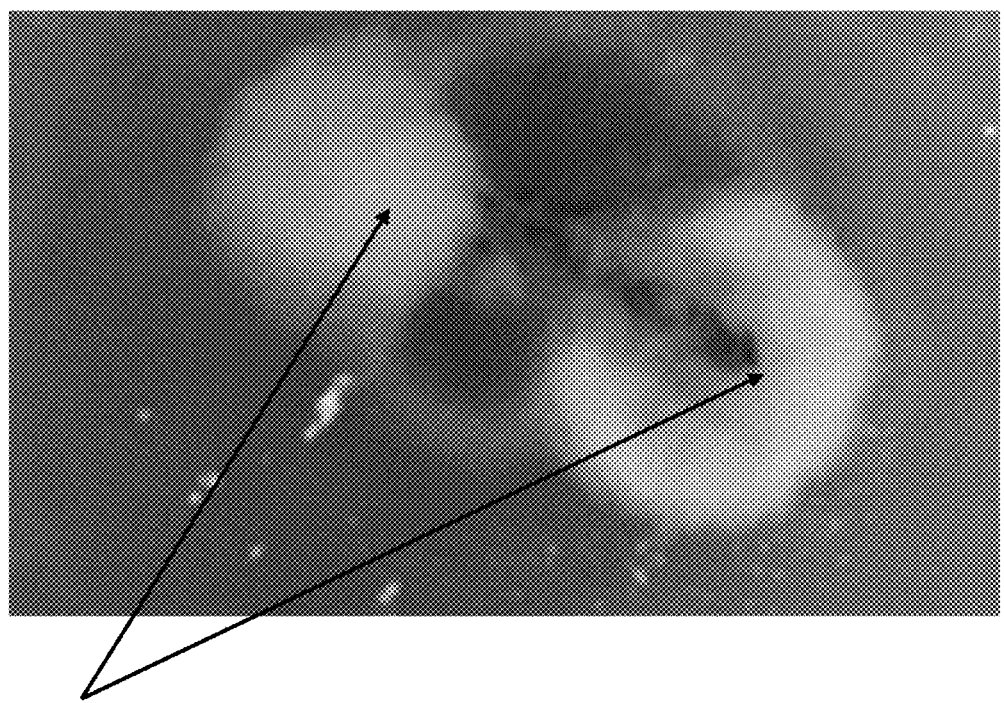

Hyphae outgrowth
on the corn roots

Hyphae outgrowth on the corn roots

CORN ROOTWORM BIOLOGICAL CONTROL

CROSS-REFERENCE TO RELATED APPLICATIONS

This application claims the benefit of U.S. Provisional Application No. 63/110,665, filed Nov. 6, 2020.

STATEMENT REGARDING FEDERALLY SPONSORED RESEARCH

NONE.

STATEMENT REGARDING JOINT DEVELOPMENT AGREEMENT

NONE.

REFERENCE TO SEQUENCING LISTING, TABLE OR COMPUTER PROGRAM LISTING

NONE.

STATEMENT REGARDING PRIOR DISCLOSURES BY THE INVENTOR OR A JOINT INVENTOR UNDER 33 C.F.R 1.77(B)(6)

NONE.

FIELD OF THE DISCLOSURE

This present disclosure relates generally to control of corn rootworms, and more particularly to a biological method for control of corn rootworms using one or more fungal species.

BACKGROUND OF THE DISCLOSURE

This section provides background information which is not necessarily prior art to the inventive concepts associated with the present disclosure.

Corn rootworms (CRW) (*Diabrotica* spp.) are potentially devastating pests to corn production, especially in the corn belt of the United States. The estimated cost to corn production caused by corn rootworm damage exceeds $1 billion per year. Gassmann, A. J., Petzold-Maxwell, J. L., Clifton, E. H., Dunbar, M. W., Hoffmann, A. M., Ingber, D. A., and Keweshan, R. S. (2014). "Field-evolved resistance by western corn rootworm to multiple *Bacillus thuringiensis* toxins in transgenic maize", Proceedings of the National Academy of Sciences of the U.S. of America 111, 5141-5146. The corn rootworm has four stages in its life cycle: egg, larva, pupa and beetle. There are three main species the Northern corn rootworm, the Western corn rootworm and the Southern corn rootworm. The Northern and Western corn rootworms are the most important to control for corn production, the Southern corn rootworm can feed on plant species other than corn. The Northern and Western corn rootworm beetles deposit their eggs in the soil in the late summer and the eggs over winter to hatch in late May or early June of the next year. The larva immediately begin to feed on corn roots and go through three larval instars during their feeding on the roots. After the third instar they can be up to ½ inch long. After feeding for several weeks the larval form goes through pupation underground to produce the winged beetle adult form. The adults, known as cucumber beetles, emerge from the soil and can feed on corn pollen and silks and may damage silks in conditions of heavy infestation and thus prevent pollination. They can also travel to other fields to spread the damage and their eggs. The adult form mates quickly after emergence and feeds for about 2 weeks. After two weeks the adults return to the soil, the female deposits the eggs in cracks in the soil and under the soil and then both male and female beetles die. The eggs over winter in the soil and the cycle repeats. The damage caused by the larval form is extensive while the damage done by the adult form is much less severe. The adult form can also eat leaves of corn and other crops and they may carry viruses that infect and damage cucumbers, see https://extension.entm.purdue.edu/fieldcropsipm/insects/corn-rootworms.php.

It is also important to note that CRW damage to corn roots can also offer windows of opportunity for infection of the corn roots by pathogenic fungi and oomycetes found in the surrounding soil. These pathogens include several species of the fungi Fusarium and Rhizoctonia as well as several species of the Pythium oomycetes. Further, damage to roots by nematodes can cause an additional significant increase in the root damage and decreased function of the root system. The combined effects of CRW, opportunistic infections and nematodes all impact the function of corn roots. Damage to corn root function not only reduces yields under ideal conditions, but especially under stressful conditions, such as drought or soil compaction, the effects are even more devastating.

In an effort to control CRW several genetically modified species of corn have been developed that were resistant to the CRW attack, however these are not entirely effective, they are expensive, they reduce crop yields compared to non-modified corn, and resistance from CRW is developing to these genetically modified varieties.

It is desirable to provide a solution to control corn rootworm that would not negatively affect crop yields, that would be cost effective and that might be synergistic with other crop protection treatments.

SUMMARY OF THE DISCLOSURE

This section provides a general summary of the present disclosure and is not intended to be interpreted as a comprehensive disclosure of its full scope or all features, aspects and objectives.

One aspect of the present disclosure is to provide a method for controlling corn rootworm damage to corn comprising the step of: applying to a corn seed from $10^3$ to $10^6$ colony forming units (CFU), more preferably from $10^4$ to $10^5$ colony forming units per seed of one of *Beauveria bassiana* strain ARSEF 2579 (BF503) or *Metarhizium pingshaence* strain ARSEF 5197 (BF517). Another aspect of the present disclosure comprises further combining either BF503 or BF517 with SabrEx® for corn, SabrEx® for corn comprises a mixture of the fungi *Trichoderma afroharzianum* strain K2 (ATCC PTA-9708) plus *Trichoderma atroviride* strain K4 (ATCC PTA-9707), and applying it to corn seeds also at $10^3$ to $10^6$, more preferably $10^4$ to $10^5$ CFU of each fungus per seed. Another method for controlling corn rootworm damage to corn according to the present disclosure comprises the step of: applying to a field planted with corn from $10^3$ to $10^6$ colony forming units per seed of one of *Beauveria bassiana* strain ARSEF 2579 or *Metarhizium pingshaence* strain ARSEF 5197 into the seed zone of each seed. Another method for controlling corn rootworm damage to corn comprises the steps of: applying to a field planted with corn from $10^3$ to $10^6$ colony forming units per seed of one of *Beauveria bassiana* strain ARSEF 2579 or

*Metarhizium pingshaence* strain ARSEF 5197 into the seed zone of each seed; and applying to the same field planted with corn from $10^3$ to $10^6$ colony forming units per seed of *Trichoderma afroharzianum* species K2 and $10^3$ to $10^6$ colony forming units per seed of *Trichoderma atroviride* species K4 into the seed zone of each seed. In this aspect the three fungi can be applied at the same time or separately.

These and other features and advantages of this disclosure will become more apparent to those skilled in the art from the detailed description herein. The drawings that accompany the detailed description are described below.

BRIEF DESCRIPTION OF THE DRAWINGS

The drawings described herein are for illustrative purposes only of selected aspects and not all implementations, and are not intended to limit the present disclosure to only that actually shown. With this in mind, various features and advantages of example aspects of the present disclosure will become apparent to one possessing ordinary skill in the art from the following written description and appended claims when considered in combination with the appended drawings, in which:

FIG. 1A is a photograph showing outgrowth of hyphae on surface sterilized roots from germinated corn seeds that were pre-treated with the fungi *Trichoderma afroharzianum* strain K2, *Trichoderma atroviride* strain K4 and *Beauveria bassiana* strain ARSEF 2579 according to the present disclosure;

FIG. 1B is a photograph showing outgrowth of *Beauveria bassiana* strain ARSEF 2579 hyphae on surface sterilized roots from germinated corn seeds that were pre-treated with this fungus according to the present disclosure;

FIG. 2 is a photograph showing outgrowth of *Metarhizium pingshaence* strain ARSEF 5197 hyphae on surface sterilized roots from germinated corn seeds that were pre-treated with this fungus according to the present disclosure;

FIG. 3 is graph showing the effect of a variety of treatments on the emergence of corn rootworm beetles from the treated plants in a field trial according to the present disclosure;

FIG. 4 is a photograph showing a system for capturing emerging beetles from a single corn plant;

FIG. 5 is a graph showing the yield in bushels per acre from corn plants under low corn rootworm pressure that were grown from control seeds, seeds treated with BF503, seeds treated with BF517, or seeds treated with SabrEx® for corn according to the present disclosure;

FIG. 6 is graph showing the effects of various seed treatments according to the present disclosure on plant dry root weight for greenhouse grown plants with no corn rootworm infestation;

FIG. 7A is graph showing the effects of soil treatment with a variety of fungal treatments according to the present disclosure on the number of dead corn rootworm larvae showing visible fungal infections found in the soil around greenhouse grown corn plants, the soil had been pre-loaded with viable corn rootworm larvae; FIG. 7B is from the same soil samples as FIG. 7A and shows the number of dead larvae not showing visible fungal infection in the soil around the greenhouse grown corn plants; and FIG. 7C shows the evidence of fungal infection in all the dead larvae samples from FIG. 7B 4 days after transference of the dead larvae to petri dishes with a rich fungal medium;

FIG. 8A is a graph showing the effects of seed treatment with a variety of fungal treatments according to the present disclosure on the number of dead corn rootworm larvae showing no fungal infection found in the soil pre-loaded with viable corn rootworm larvae after planting the seeds; FIG. 8B shows the evidence of fungal infection in all the dead larvae samples from FIG. 8A 4 days after transference of the dead larvae to petri dishes with a rich fungal medium;

FIG. 9 is a graph showing field trial results in terms of bushels of corn per acre following seed treatments with a variety of fungal organisms according to the present disclosure;

FIG. 10A is a graph showing the number of plants produced per acre from conventional seeds or genetically modified Bt (mCry3A) genetically modified corn seeds each treated with various fungal treatments according to the present disclosure, the first bar in each treatment is the result for conventional corn seeds and the second bar is the result for genetically modified Bt (mCry3A) corn seeds; FIG. 10B represents the yield in terms of bushels of corn per acre at harvest time for each condition in the same field;

FIG. 11 is a graph showing the results from another field trial evaluating the yield in bushels per acre for conventional corn seeds or genetically modified Bt (mCry3A) seeds treated with a variety of fungal treatments according to the present disclosure, the first bar in each treatment is for conventional seeds and the second bar is for genetically modified Bt (mCry3A) seeds; and FIG. 12 is a graph showing the results from two other field trials evaluating the yield in bushels per acre for conventional corn seeds treated with a variety of fungal treatments according to the present disclosure.

DETAILED DESCRIPTION OF THE DISCLOSURE

In the following description, details are set forth to provide an understanding of the present disclosure.

For clarity purposes, example aspects are discussed herein to convey the scope of the disclosure to those skilled in the relevant art. Numerous specific details are set forth such as examples of specific components, devices, and methods, in order to provide a thorough understanding of various aspects of the present disclosure. It will be apparent to those skilled in the art that specific details need not be discussed herein, such as well-known processes, well-known device structures, and well-known technologies, as they are already well understood by those skilled in the art, and that example embodiments may be embodied in many different forms and that neither should be construed to limit the scope of the disclosure.

The terminology used herein is for the purpose of describing particular example aspects only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or feature is referred to as being "on," "engaged to," "connected to," "coupled to" "operably connected to" or "in operable communication with" another element or feature, it may be directly on, engaged, connected or coupled to the other element or layer, or intervening elements or features may be present. In contrast, when an element is referred to as being "directly on," "directly engaged to," "directly connected to," or "directly coupled to" another element or feature, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly and expressly indicated by the context. Thus, a first element, component, region, layer or section discussed below could be termed a second element, component, region, layer or section without departing from the teachings of the example embodiments.

For purposes of description herein, the terms "upper," "lower," "right," "left," "rear," "front," "vertical," "horizontal," and derivatives thereof shall relate to the invention as oriented in the FIGS. However, it is to be understood that the present disclosure may assume various alternative orientations and step sequences, except where expressly specified to the contrary. It is also to be understood that the specific devices and processes illustrated in the attached drawings, and described in the following specification are exemplary aspects of the inventive concepts defined in the appended claims. Hence, specific dimensions and other physical characteristics relating to the aspects disclosed herein are not to be considered as limiting, unless the claims expressly state otherwise.

In the past several methods for control of CRW have been developed; however, all are only partially effective. Initially, crop rotation was practiced with the idea being that the overwintered larval form would have no food source in the next year and thus die out. Although initially effective, CRW have now developed an extended diapause ability and thus can remain dormant during the rotation year and emerge the second year when corn is again planted in the rotation field. In addition, the beetle adult form has developed the ability to feed on the leaves of other plants such as soybeans, thus allowing it to survive, mate and deposit eggs into the soil of the rotation field. Other treatments have included application of chemical pesticides to the corn seeds prior to planting them. This is only partially effective because the chemical pesticide stays with the seed coat and thus the chemical pesticides are only effective at locations very close to the seed following germination. Since the CRW attacks the root system of the corn the larvae are often too far from the chemical pesticide for the pesticide to be effective. Prophylactic insecticides may be applied to the plants; however, they are expensive and generally only about 15% effective. Other insecticides such as carbofuran, marketed as Furadan® by FMC Corporation were used in the past as a post-emergence application, it is a highly toxic carbamate pesticide. The effectiveness was highly dependent on proper timing if too late or too early it was not effective. Because of its high toxicity and hazard to humans the EPA revoked all tolerances for it on Aug. 13, 2009, thus it is no longer a viable treatment option.

Recent advances in corn genetics has led to the development of corn varieties that have been transformed to contain genes encoding three different versions of Cry toxins from *Bacillus thuringiensis*. These genetically modified corn varieties, for example Bt (mCry3A), are designated in the present specification and claims as corn having Bt traits. These Cry gene products are toxic to the CRW but resistance developed almost as soon as the transgenic varieties were introduced. This was in part because high levels of killing require relatively high levels of the toxin to be produced, and many Bt trait corn varieties had insufficient levels of the toxin to kill all of the pest population. If a low level of pests survive this first onslaught of the new toxic species, these survivors are generally more resistant to the expressed material. Therefore, resistance to all three of the transgene toxins has developed, see Gassmann, A. J., Petzold-Maxwell, J. L., Clifton, E. H., Dunbar, M. W., Hoffmann, A. M., Ingber, D. A., and Keweshan, R. S. (2014). "Field-evolved resistance by western corn rootworm to multiple *Bacillus thuringiensis* toxins in transgenic maize", Proceedings of the National Academy of Sciences of the United States of America 111, 5141-5146.

Thus, it is clear that new tools need to be developed to combat the destructive effects of the CRW and the present disclosure is directed to providing a new set of tools. The present disclosure is directed to the use of the fungi *Beauveria bassiana* strain ARSEF 2579 or *Metarhizium pingshaence* strain ARSEF 5197 either alone or in combination with the fungi *Trichoderma afroharzianum* strain K2 (ATCC PTA-9708) and *Trichoderma atroviride* strain K4 (ATCC PTA-9707) to treat corn rootworm. The designation of ARSEF refers to the United States Department of Agriculture ARS entomopathogenic fungal collection. These fungi, *Beauveria bassiana* strain ARSEF 2579 or *Metarhizium pingshaence* strain ARSEF 5197, can be obtained from the USDA-ARS BioIPM Research Unit, Robert W. Holley Center for Agriculture & Health, 538 Tower Rd., Ithaca, New York, USA. This collection has developed out of the United States Department of Agriculture, ARS Plant Protection Research Unit. The numbers refer to the accession numbers for this collection. The fungi *Beauveria bassiana* strain ARSEF 2579 and the *Metarhizium pingshaence* strain ARSEF 5197 are both entomopathogenic fungus species meaning they can act as a parasite of certain insects. The fungi *Beauveria bassiana* strain ARSEF 2579 is also designated in the present specification, figures and claims as BF503 and the *Metarhizium pingshaence* strain ARSEF 5197 is also designated in the present specification, figures and claims as BF517. The combination of the fungi *Trichoderma afroharzianum* strain K2 (ATCC PTA 9708) and *Trichoderma atroviride* strain K4 (ATCC PTA 9707) is sold by Advanced Biological Marketing Inc. as SabrEx® for corn. The designation ATCC refers to the American Type Culture Collection with the number referring to the accession number of the strain as known to one of skill in the art.

Entomopathogenic fungi typically parasitize insects in the following manner. The fungus attaches as spores to the external body surface of the insect. Under the proper temperature and humidity conditions these spores then germinate and grow as hyphae to colonize the insect's cuticle. The hyphae then bore through the cuticle using an enzymatic hydrolysis mechanism to penetrate the body cavity. The hyphae then proliferate in the body cavity, usually as walled hyphae although they can also proceed as walless protoplasts. The proliferation then usually results in the death of the insect. New spores can develop in the dead insect under the right temperature and humidity conditions.

Figure 1B:
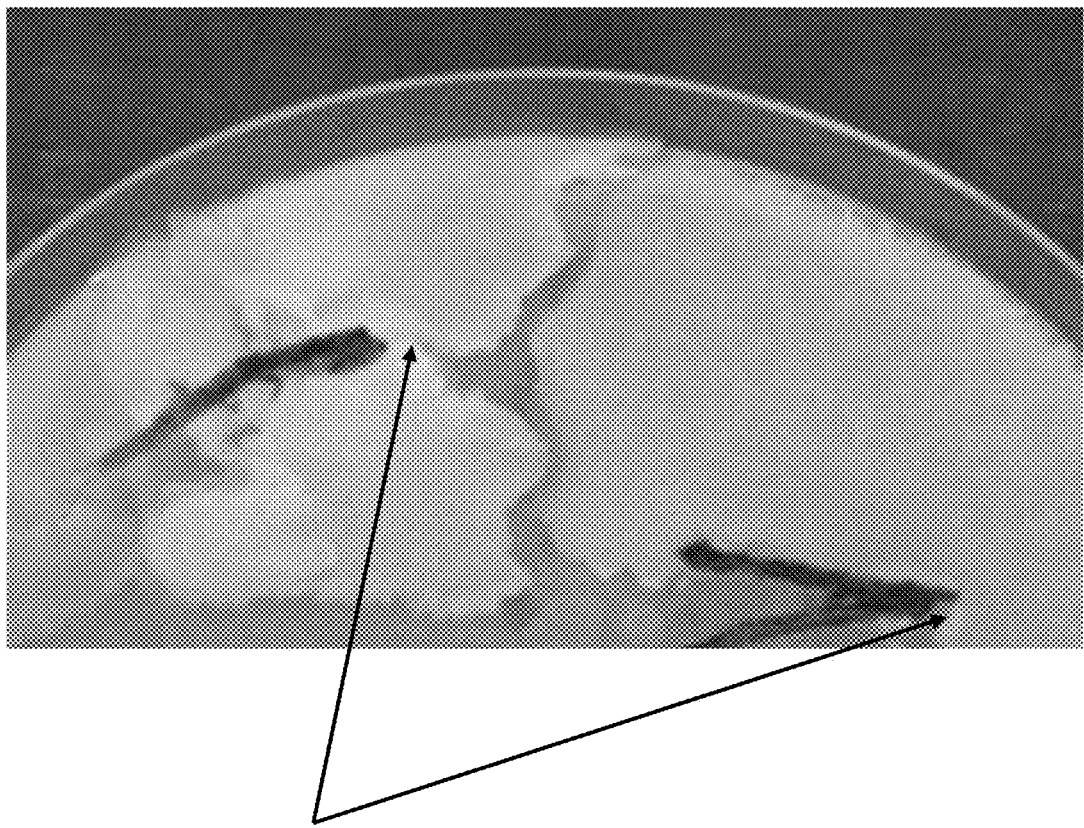

Referring in more detail to the drawings, FIG. 1A is a photograph showing outgrowth of hyphae on surface sterilized roots from germinated corn seeds that were pre-treated with the fungi *Trichoderma afroharzianum* strain K2, *Trichoderma atroviride* strain K4 and *Beauveria bassiana* strain ARSEF 2579. The seeds used were a standard, non-genetically modified corn variety. For this experiment, the seeds were coated with $10^4$ colony forming units (CFU) of each fungus and then planted. Although a seed level of $10^4$ CFU was used in all the experiments reported in the present specification the preferred range is from $10^3$ to $10^6$ CFU, and more preferably from $10^4$ to $10^5$ CFU per seed of each fungus used. The fungi were applied to the seeds using a Hege Seed Treater which applies the fungi using a seed bowl and spinning disc as known to one of skill in the art. Once the seeds had germinated they were removed from the soil and the root outgrowths were surface sterilized and then the surface sterilized germinated seeds were plated out onto a non-selective fungal culture media of acidified potato dextrose agar (aPDA). In FIG. 1A it can be seen that after a period of 5 days the roots show evidence of hyphae outgrowth of BF503, and the two *Trichoderma* species in the SabrEx® for corn. In FIG. 1B the seeds had been treated only with BF503 and after surface sterilization they were plated on the selective fungal media SDAY, which is Sabouraud dextrose agar (w/v: 4% glucose, 1% peptone, 2% agar and 1% yeast extract). It can be seen that even on this selective media there is outgrowth of hyphae of the BF503 after five days. These results show that BF503 is capable of exhibiting an endophytic lifestyle similar to the *Trichoderma* strains in SabrEx® for corn. By endophytic lifestyle it is meant that the BF503 fungus is able to internally infect the germinated corn seed following surface coating of the seed. This is done with no visible manifestation of any disease on the germinated corn. The fungus is able to live in mutualistic association with the corn plant and is also able to grow out with the roots as they develop. This means the active fungus will be in the exact location attacked by corn rootworm following surface treatment of the seeds. In addition, it will "grow" out with the roots as they develop to provide complete coverage of the root system.

Figure 2:
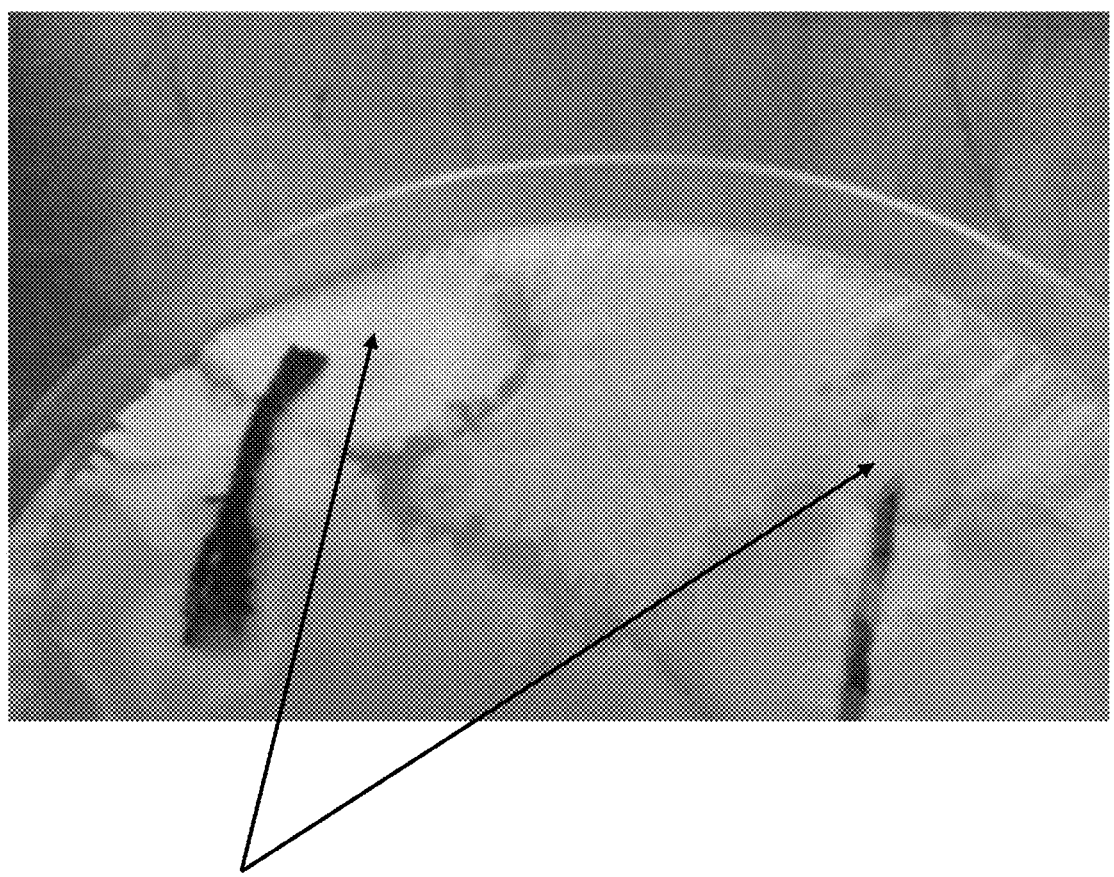

FIG. 2 is a photograph showing outgrowth of *Metarhizium pingshaence* strain ARSEF 5197 hyphae on surface sterilized roots from germinated corn seeds that were pretreated with this fungus. As described above with respect to FIGS. 1A and 1B, the corn seeds were pretreated with $10^4$ colony forming units of *Metarhizium pingshaence* strain ARSEF 5197, allowed to germinate, surface sterilized and then plated out on SDAY media. Again, it is shown that on this selective media there is outgrowth of hyphae of the BF517 after five days. These results show that BF517 is also capable of exhibiting an endophytic lifestyle similar to the BF503 and the *Trichoderma* strains in SabrEx® for corn. By endophytic lifestyle it is meant that the BF517 fungus is able to internally infect the germinated corn seed following surface coating of the seed. This is done with no visible manifestation of any disease on the germinated corn. The fungus is able to live in mutualistic association with the corn plant and is also able to grow out with the roots as they develop. This means the active fungus will be in the exact location attacked by corn rootworm following surface treatment of the seeds. In addition, it will "grow out" with the roots as they develop to protect the entire root system.

Figure 3:
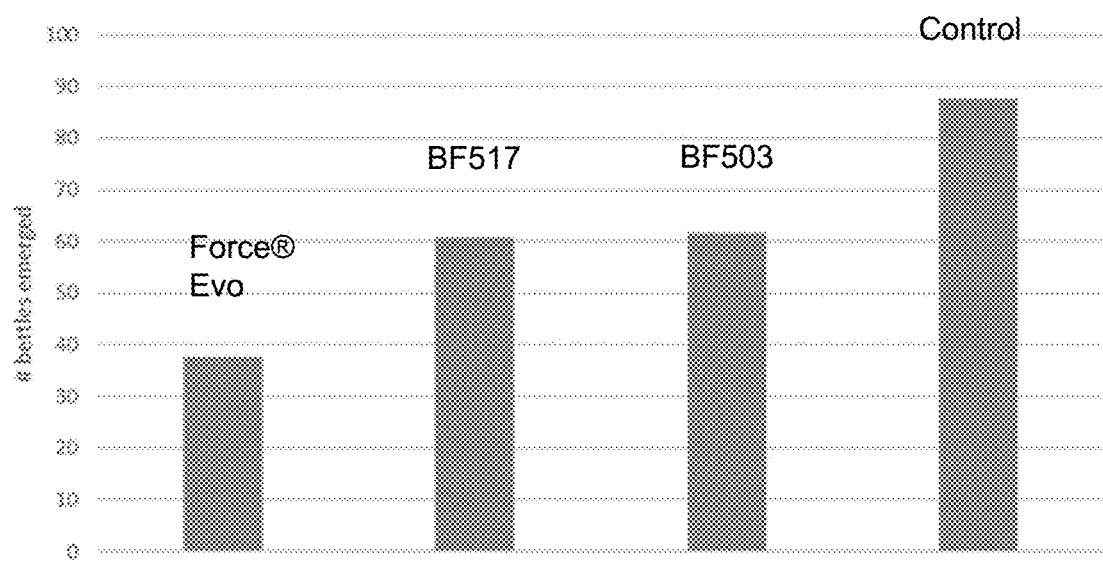

The long-term effects of seed treatment with either BF503 or BF517 on corn rootworm beetles was determined in a field trial. In a first experiment the corn seeds were treated with $10^4$ CFU of either BF503 or BF517 prior to planting in a field. The results are shown in FIG. 3 and explained below. Corn in the same field was either not treated or treated at a stage of V3, three leaf collars stage, with in furrow application of Force® Evo according to the manufacturer's instructions. The compound Force® Evo is a chemical insecticide treatment of tefluthrin, available from Syngenta.

Figure 4:

As shown in FIG. 3 pre-treatment of the corn seeds with either BF503 or BF517 at $10^4$ CFU resulted in a reduction of the number of beetles that emerged from the treated plants compared to the control plants, which were not treated with any fungus. The insecticide Force®Evo was also effective in reducing the number of beetles to emerge from treated plants. However, the use of Force®Evo requires precise timing, is costly and can have environmental consequences. In FIG. 4 a photograph is shown of the set up to capture beetles as they emerge from the soil around a plant.

Figure 5:
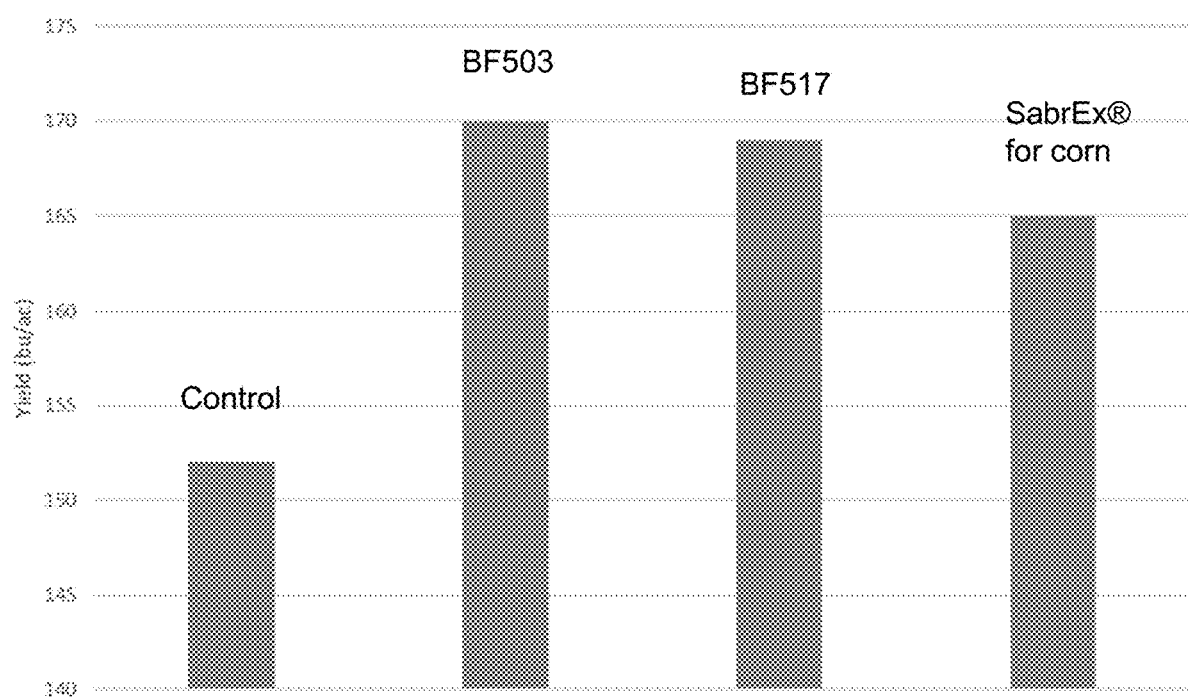

In another field test corn seeds were treated with: BF503; BF517; SabrEx® for corn, which contains *Trichoderma afroharzianum* strain K2 and *Trichoderma atroviride* strain K4; or nothing prior to being planted in a field. Again, each fungus was applied to the seeds at a level of $10^4$ CFU per seed. The field the plants were planted in had a very low corn rootworm pressure. The results are shown in FIG. 5. It shows the yield in bushels per acre under the four treatment protocols. As can be seen treatment of the seeds with either BF503 or BF517 results in a significant increase in yield, even in the absence of corn rootworm pressure. This is a significant result since it shows that application of the BF503 or BF517 will be beneficial even if there is a low or no corn rootworm pressure. Many of the prior art treatments for CRW result in a penalty in terms of crop product yield. This is especially true of the genetically modified corn seeds which tend to have a yield penalty. Thus, the present disclosure provides a treatment that can be used in anticipation of a corn rootworm infestation in a field; however, even if there is not a corn rootworm infestation in the field the treatment provides a benefit of enhanced yield of corn.

Figure 6:
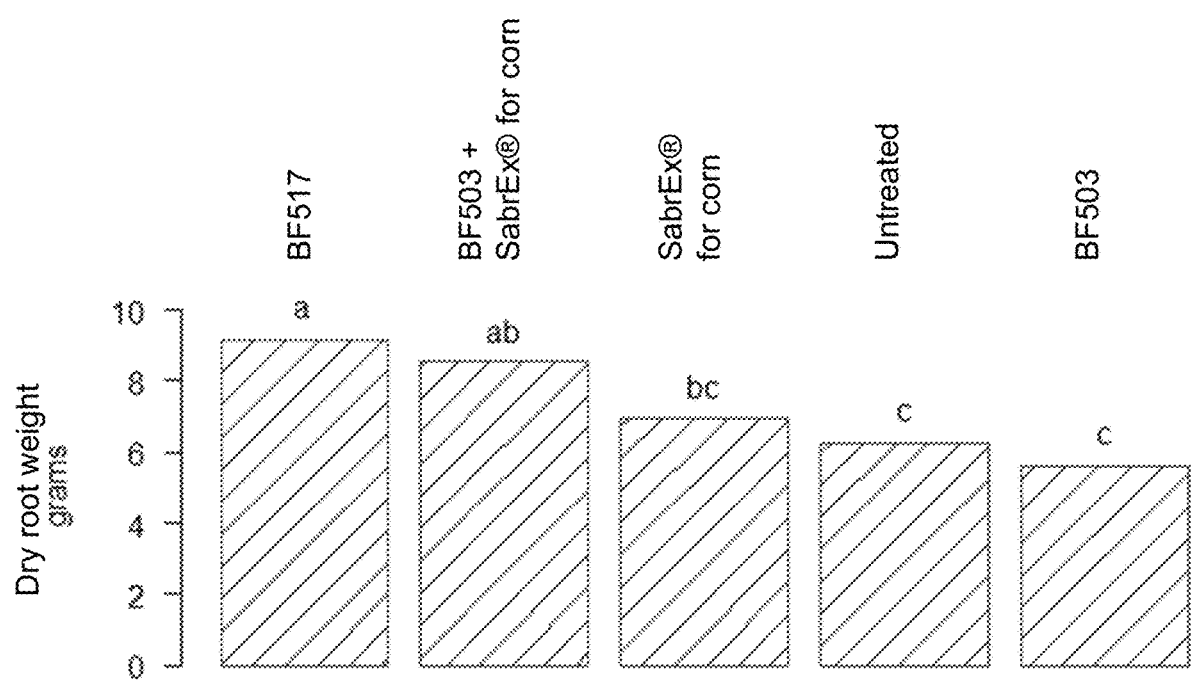

In another experiment seeds were treated with a variety of fungal treatments at $10^4$ CFU per seed and planted in a greenhouse setting with no corn rootworm infestations. The corn variety was a conventional, non-genetically modified corn seed. The seeds were planted as follows. They were planted in autoclaved soil in pots and raised under greenhouse conditions. The moisture in the pots was checked daily with water added as needed. After 10 days the plants were harvested and the dry root weight was measured. The results are shown in FIG. 6. Different letter designations indicate significant differences at an alpha value of 0.1. The results show that BF503 alone had no effect on dry root weight in the tested plants compared to the untreated control seeds. Likewise, treatment with SabrEx® for corn alone did not provide a benefit to dry root weight compared to untreated seeds. One sees, however, that the combination of BF503 and SabrEx® for corn did result in an increase in dry root weight compared to the control, BF503 alone or SabrEx® for corn alone. This suggests an enhanced synergy from the combination of SabrEx® for corn and BF503 not evident for either treatment alone. Finally, treatment with BF517 alone provided the best enhancement of dry root weight compared to all of the other treatments. These results show again that treatment of the seeds with BF517 or BF503 in combination with SabrEx® for corn can result in beneficial increases in corn plant health even in the absence of any corn rootworm infestation.

Figure 7A:
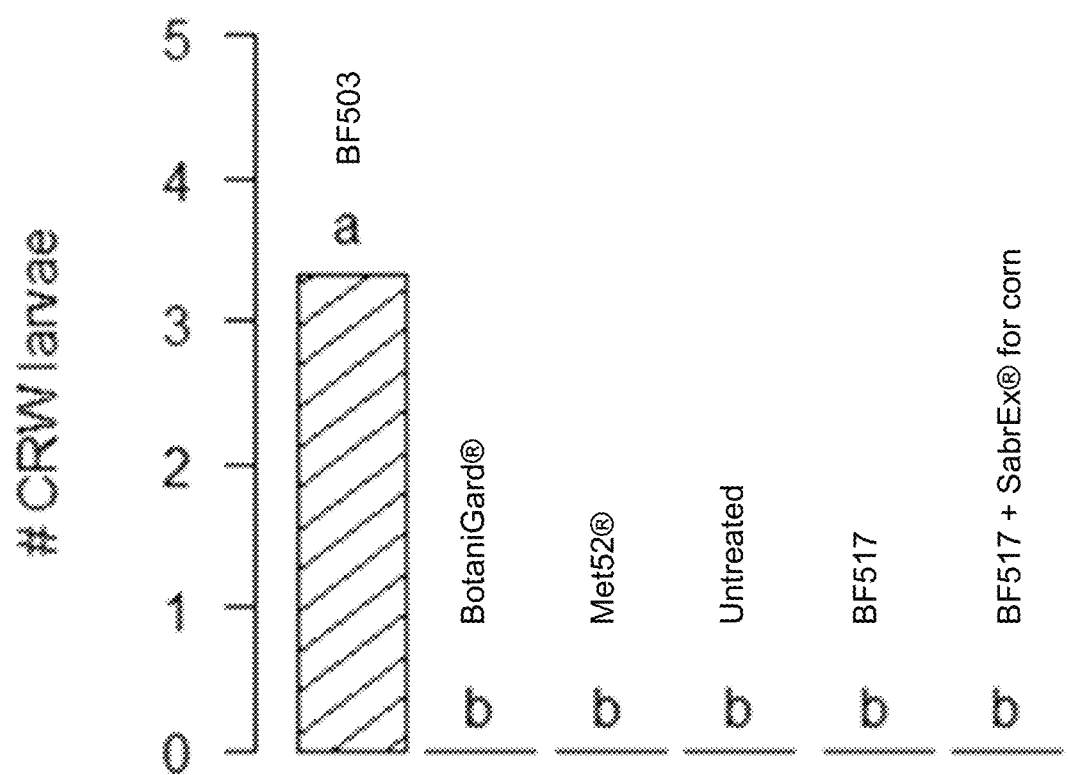
Figure 7B:
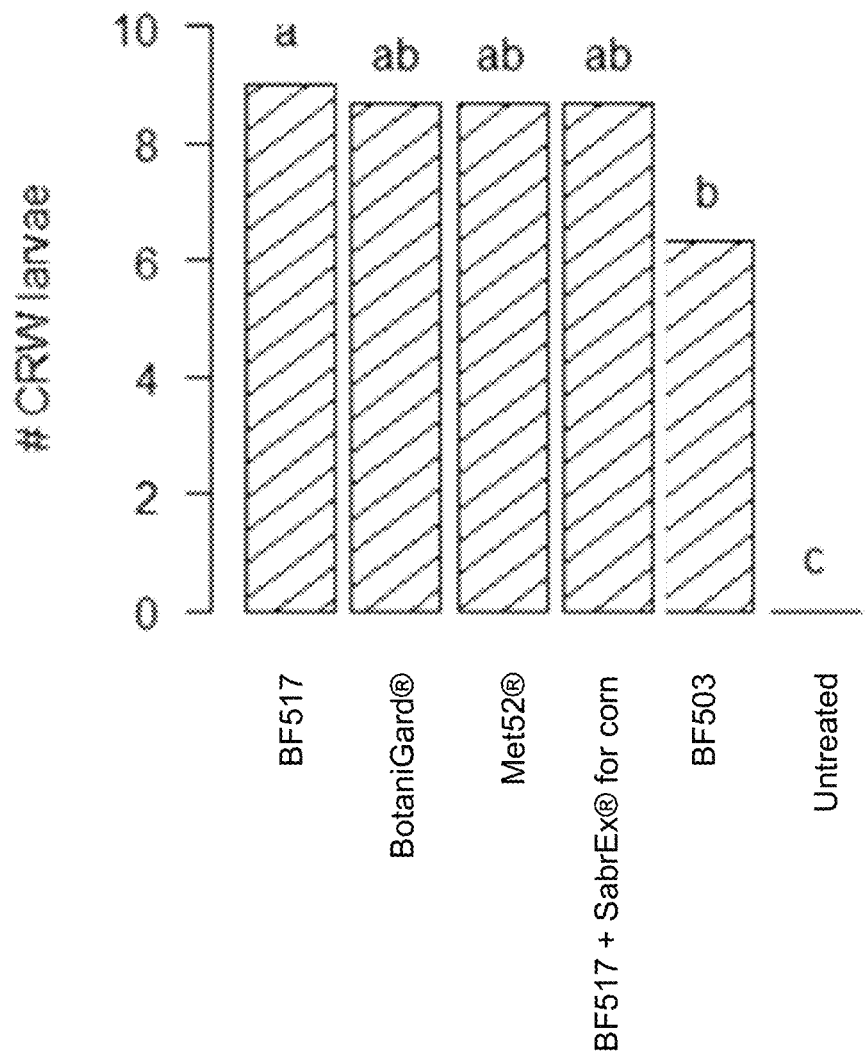
Figure 7C:
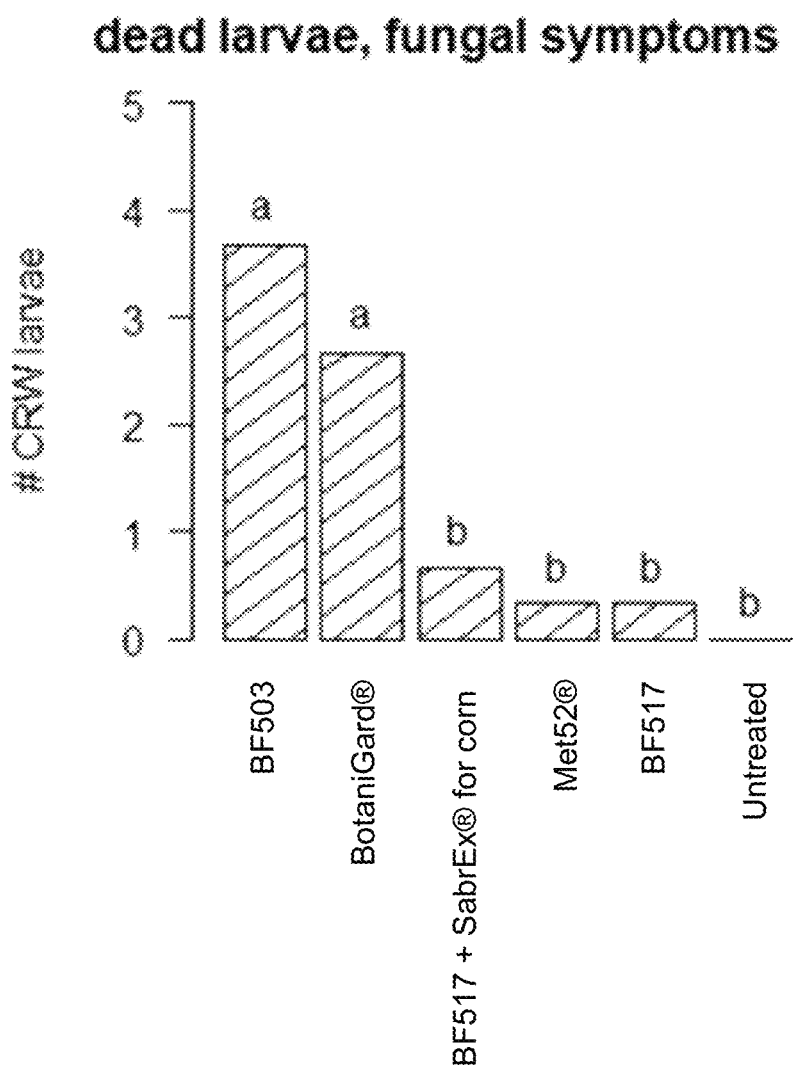

In another greenhouse experiment the soil was treated with various treatments then 4 day old corn seedlings were planted in test soils along with introduction of corn rootworm larva and nutrients. The protocol was as follows. The soil was inoculated by mixing 100 grams of sieved soil with 10 milliliters of spore suspension containing $10^7$ CFU per milliliter of the fungus and then placing approximately 30 grams of soil in each cup. The spores used were BR503, BF517, BF517 plus SabrEx® for corn, BotaniGard® and Met52®. The BF503, BF517 and SabrEx® for corn are described above. The BotaniGard® is sold commercially by Laverlam International Corporation and contains *Beauveria bassiana* strain GHA. It is not marketed as a treatment for corn rootworm. The Met52® is sold commercially by Novozymes Bilogicals Inc., it is a suspension of *Metarhizium anisopliae* strain F52. It is also not marketed as a treatment for corn rootworm. In each cup the following was placed: ten 15-17 day old $3^{rd}$ instar of *Diabrotica virgifera virgifera* (Western corn rootworm) larvae and three 4 day old corn seedlings. The cup lids had holes poked in them and they were covered with a fine mesh to prevent the larvae from escaping. The cups were incubated in the dark at 70% relative humidity in an incubator set at 25° C.±2° C. The conditions were run for 10 days and then the soil for each condition was collected and analyzed for the presence of dead and live corn rootworm larvae and for evidence of sporulation on the larvae. In FIG. 7A the data shown is the number of dead larvae having evidence of fungal infection found in each condition after 10 days. The letter designations in all the figures indicate significance at an alpha of 0.1. In FIG. 7B the data shown is of the number of dead larvae with no evident fungal infection from each of these conditions. The dead larvae from the data shown in FIG. 7B were then surface sterilized in a 10% sodium hypochlorite solution for 60 seconds with gentle agitation, then two successive rinses with double distilled water, blotted dry then transferred to petri dishes in a high humidity moist chamber and incubated for an additional 4 days to see if evidence of fungal infection was observed. The number of dead larvae showing fungal infection after 4 days for each condition is shown in FIG. 7C.

The data demonstrates that only BF503 seems to show any significant fungal infection in the dead larvae during the first 10 days. The other treatments showed no visible fungal infection after 10 days as shown in FIG. 7A. In FIG. 7B it is shown that the other treatments all showed dead larvae without visible fungal infection. In addition, the BF503 samples also showed a significant number of dead larvae with no visible fungal infections. If one adds the results from FIGS. 7A and 7B one sees that all the treatments resulted in the approximately the same number of total dead larvae, approximately 9-10. The only difference is that BF503 showed dead larvae with fungal infections. As shown in FIG. 7C even after 4 additional days, only BF503 and BotaniGard® showed dead larvae with fungal infections. It appears that the majority of the dead larvae seen in FIG. 7B after treatment with BF503 did have fungal infections that were not detectable as evidenced by the fact that the majority of dead larvae in FIG. 7B under treatment with BF503 later showed fungal infection in FIG. 7C. It also appears that about ⅓ of the dead larvae after BotaniGard® treatment later showed fungal infection in FIG. 7C. The data in total suggests that the killing of corn rootworm larvae by BF503 occurs predominantly through fungal infection with a smaller component of death via another undefined mechanism not including fungal infection. It also appears that most of the death by BF517, BotaniGard®, Met52®, or the combination of BF517 with SabrEx® for corn occurs through a non-fungal infection mediated mechanism. A small portion of the death from BotaniGard® occurs through a delayed fungal infection.

Figure 8A:
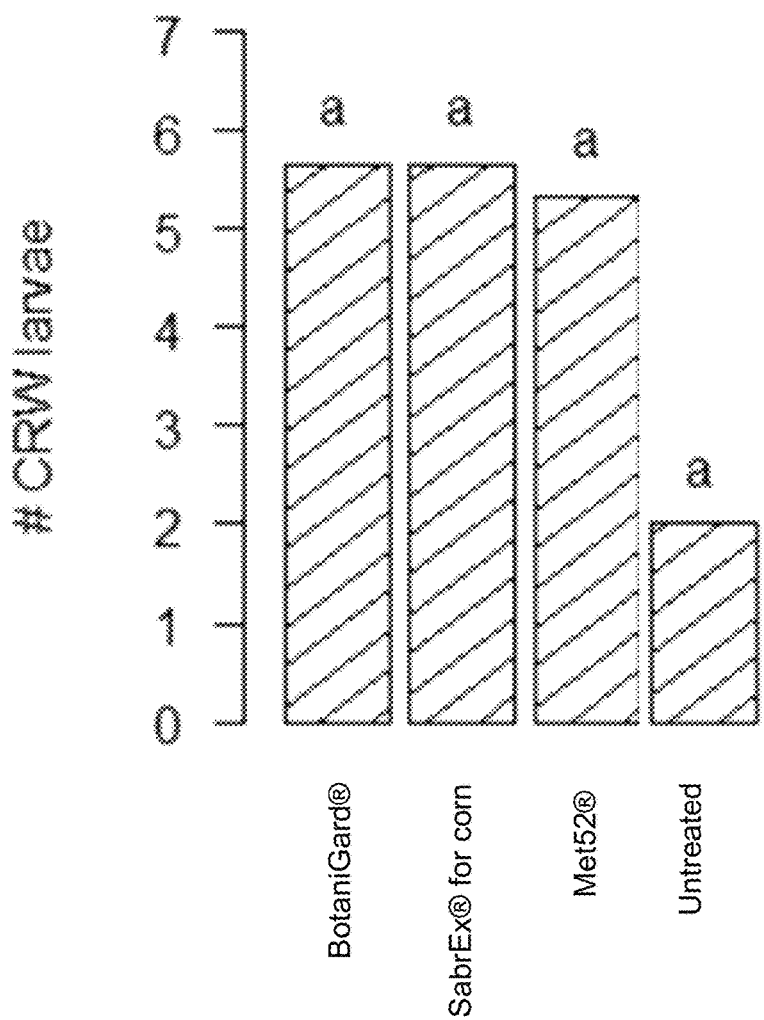
Figure 8B:
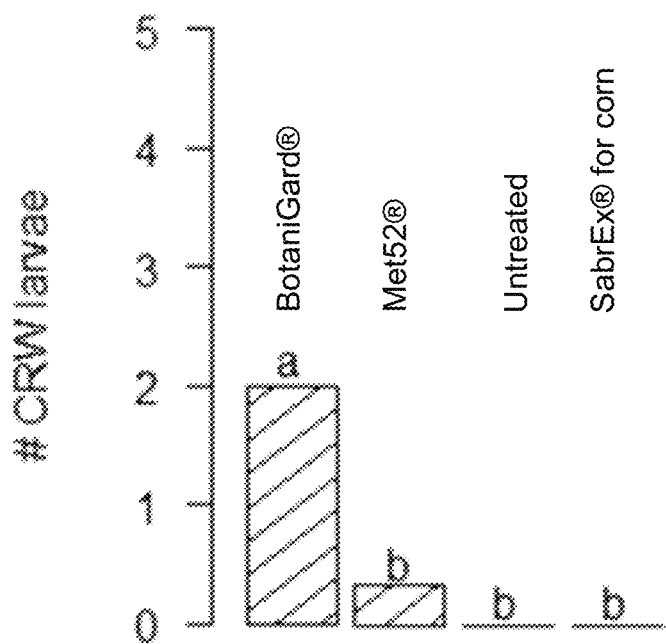

In another greenhouse experiment the seeds were pre-treated with the fungal treatments at $10^4$ CFU per seed as described above and then planted in autoclaved soil and grown until stage V3. At stage V3, three leaf collar stage, each cup was infested with ten corn rootworm larvae as described above for the data of FIGS. 7A to 7C and after 10 days the number of dead larvae in each sample was counted. In these seed treatments none of the dead larvae exhibited any visible sign of fungal infection. The number of dead larvae in each treatment are shown in FIG. 8B, none of these showed visible signs of fungal infection. As shown in FIG. 8A each fungal treatment resulted in a large number of dead larvae compared to control. Only the BotaniGard® treated seeds showed any significant evidence, at a level of alpha 0.1, of fungal infection as shown in FIG. 8B. These results are in contrast to those seen when the soil was treated with these fungal treatments. It appears that with seed treatment there is very little evidence in the dead larvae of fungal infection. Instead the killing of the larvae may proceed by a different route. The total number of dead larvae was similar in the two protocols. These results along with those shown in FIG. 7A to 7C demonstrate that the fungal treatments according to the present invention are effect whether applied to the soil or to the seeds. It is expected that application to the seeds may be a more cost-effective treatment process.

Figure 9:
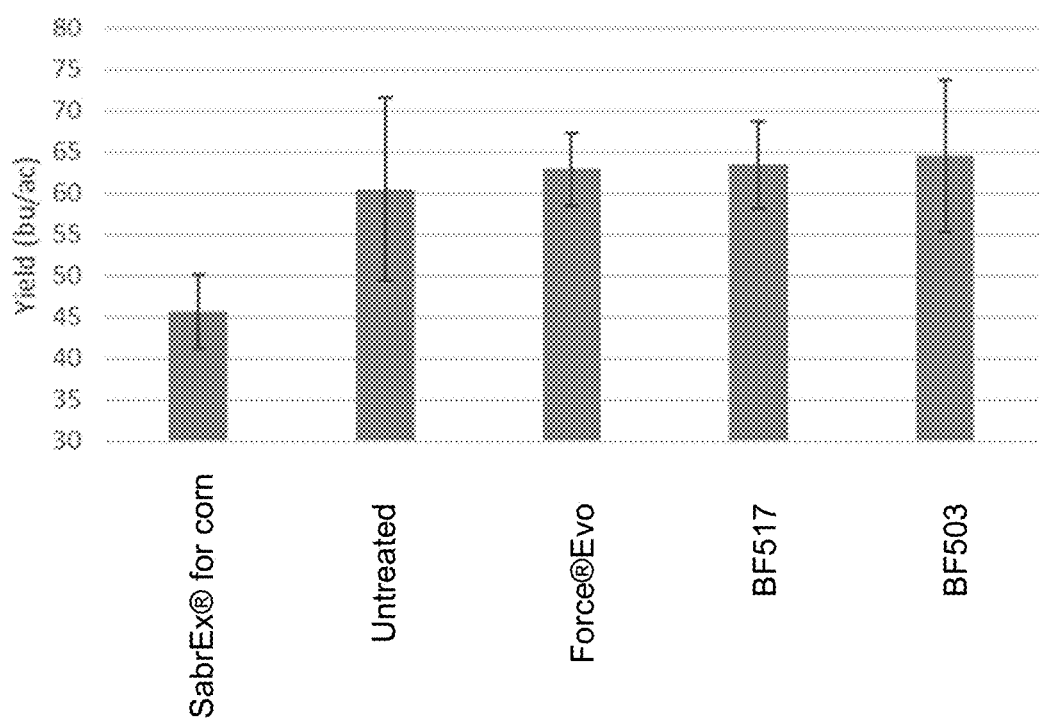

In FIG. 9 the results of another field trial are presented. For this trial the seeds were pre-treated with the indicated fungal treatments as described above at a level of $10^4$ CFU per seed and then planted. The Force® Evo samples were treated in furrow as described above. The field had significant corn rootworm pressure and suffered 2 major in season hail events that resulted in an approximately 40% yield loss due to the timing and extent of damage from the hail. The variability of yield was high especially in the control corn and those treated with the BF503. The data demonstrates again that use of the BF517 or BF503 alone does not cause a use penalty in terms of yield, in this instance it was in the face of corn rootworm pressure. As shown in FIG. 5 if the treated seeds are grown in a field with low corn rootworm pressure the yield is actually increased by BF517 or BF503 treatment of the seeds. Unlike the data shown in FIG. 5, in this trial SabrEx® for corn seemed to have a penalty on the yield.

Figure 10A:
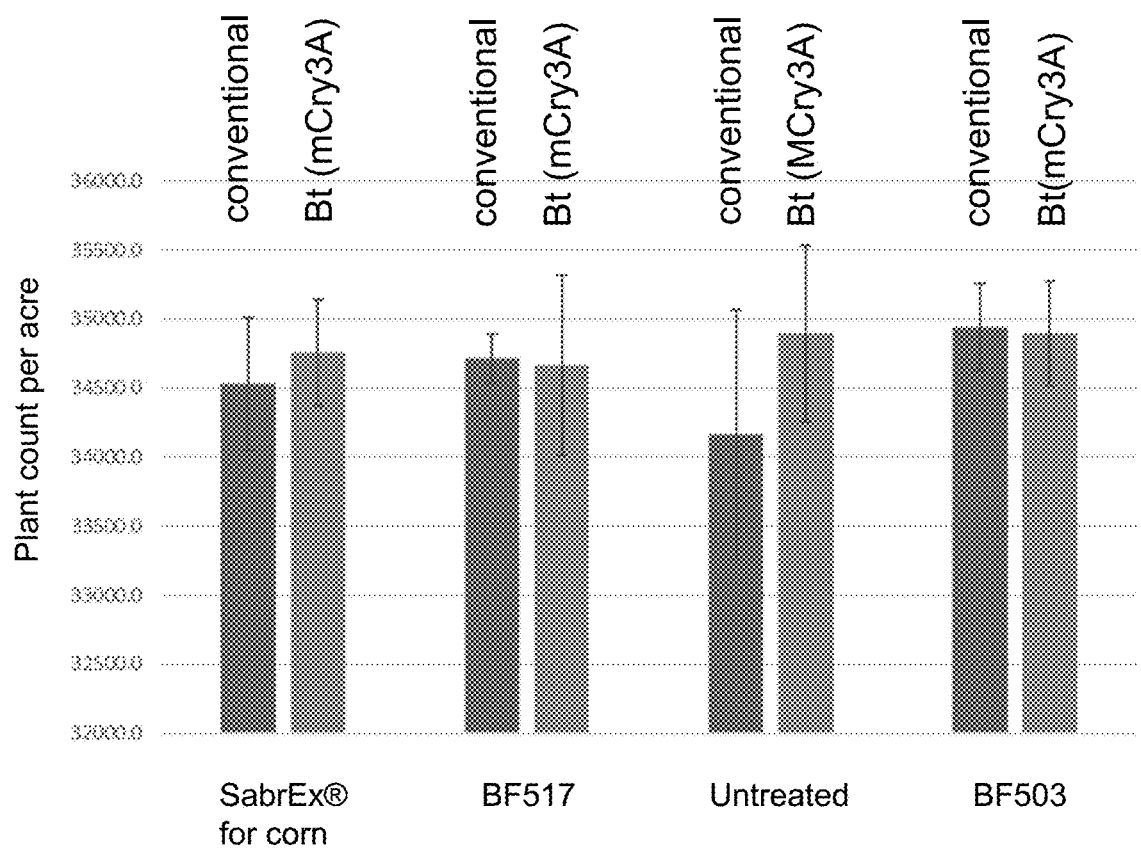
Figure 10B:
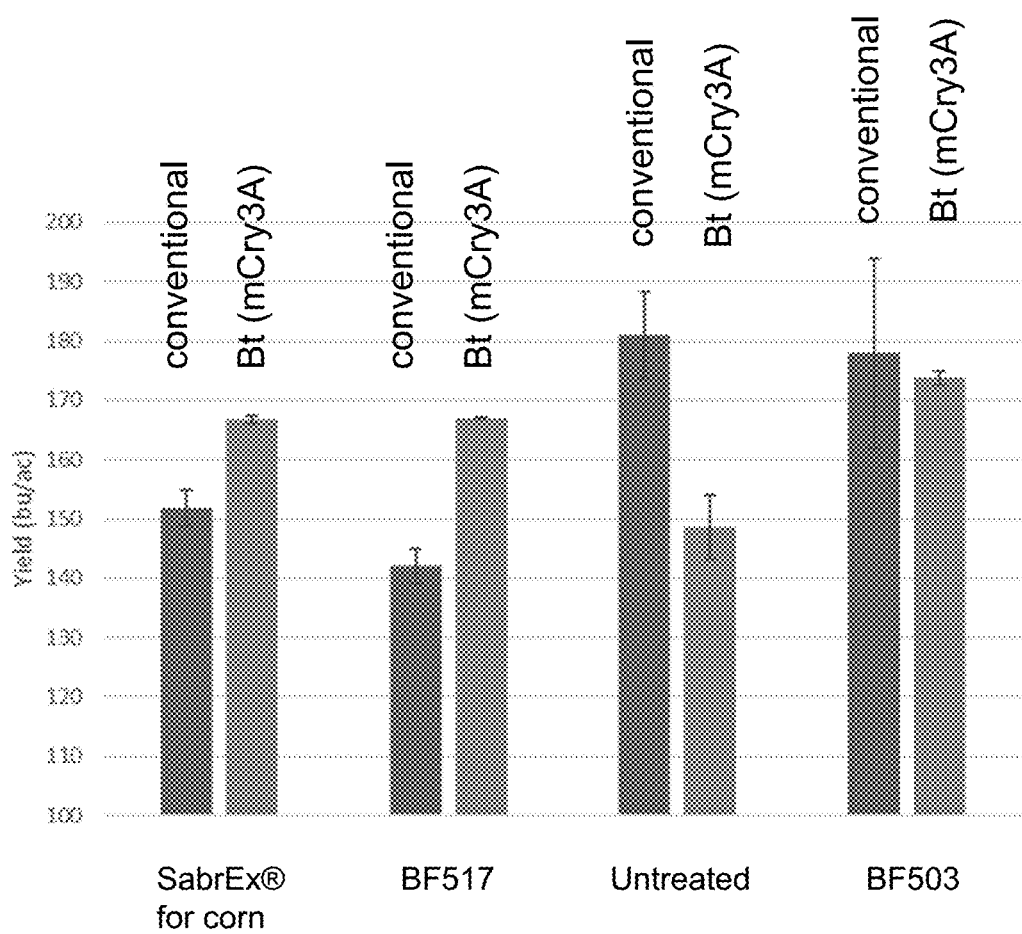

In FIGS. 10A and 10B the results of another field trial are presented. In this trial either conventional corn seeds or genetically modified corn seeds were treated with the fungal treatments at a level of $10^4$ CFU per seed as described above and then planted in the field. The genetically modified corn was Bt (mCry3A) which expresses the Cry3A toxic protein from *Bacillus thuringiensis*. The results in FIG. 10A show the number of plants per acre under the various treatments at stage V3, three leaf collars stage, into the growing season. The results in FIG. 10B represent the yield in term of bushels of corn per acre at harvest. The first bar in each treatment is the result for conventional corn seeds while the second bar is the result for the Bt (mCry3A) corn seeds. The results in FIG. 10A show that the fungal treatments were able to equalize the stand counts between the normal seeds and the genetically modified ones in terms of stand counts. The results of yield shown in FIG. 10B present a more complex picture. One sees in untreated seeds that there was a penalty in the yield per acre for using the Bt (mCry3A) seeds. By way of contrast, one sees that all of the fungal treatments were able to increase the yield from the genetically modified seeds compared to the results with the untreated Bt (mCry3A) seeds. In addition, the results with the genetically modified seeds treated with the fungal treatments of SabrEx® for corn or BF517 seemed to be even better than those achieved with the control seeds; however, the best results for conventional corn seeds or genetically modified corn seeds were seen with treatment with BF503.

Figure 11:
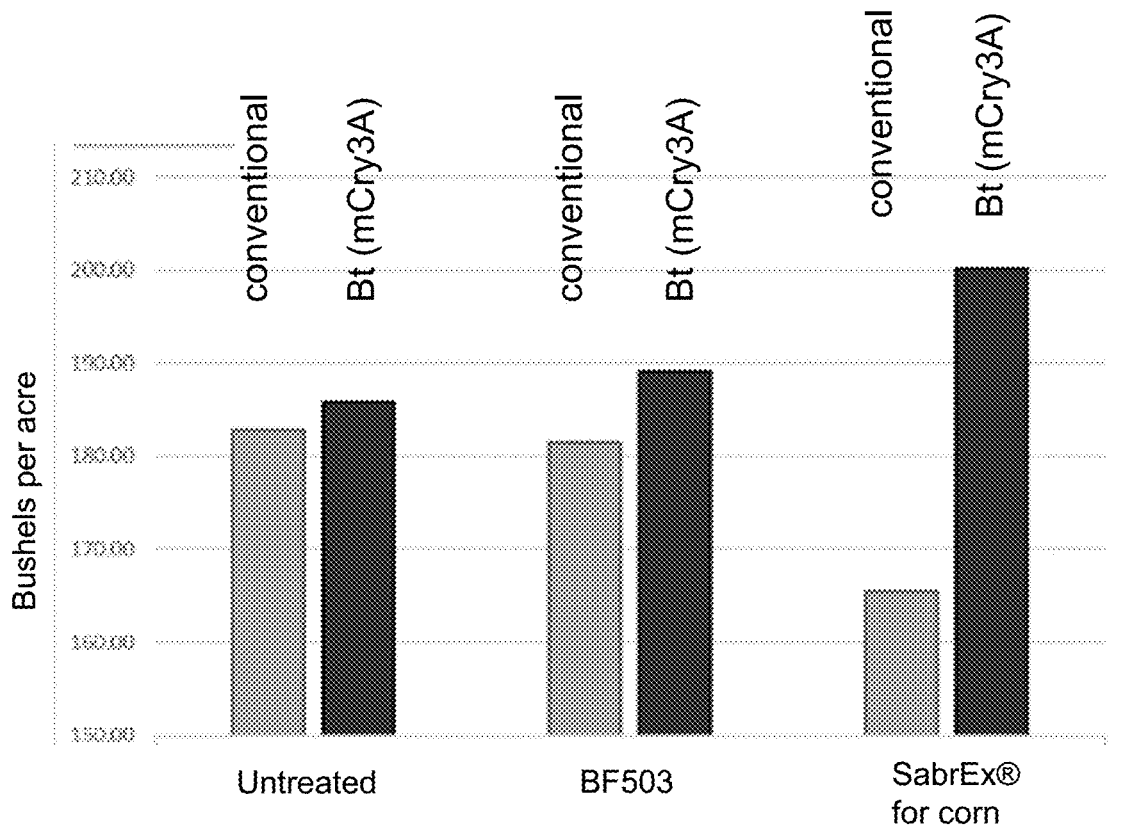

The results shown in FIG. 11 are from another field trial evaluating yield in bushels per acre for conventional corn seeds or genetically modified Bt (mCry3A) seeds treated with a variety of fungal treatments at $10^4$ CFU per seed, the first bar in each treatment is for the conventional seeds and the second bar is for the Bt (mCry3A) seeds. The field had low corn rootworm pressure. The trend of the results is that the genetically modified seeds performed at least as well as the conventional corn using the untreated seeds. The fungal treated genetically modified seeds seemed to have a slightly better yield. The results with the SabrEx® for corn treatment on the conventional seeds were not expected and there is no current explanation for the lower yield.

Figure 12:
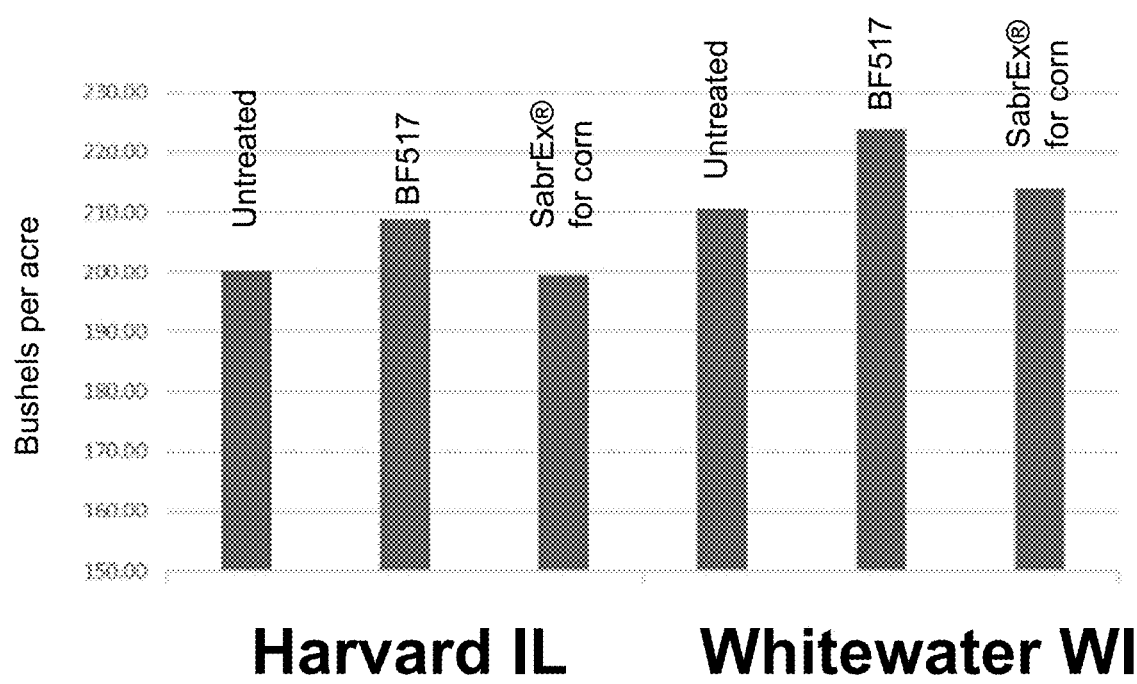

The results in FIG. 12 are from two different field trials, one from Harvard, Illinois and one from Whitewater, Wisconsin both in the same growing season. The conventional corn seeds were treated with the fungal treatments at $10^4$ CFU per seed and grown to harvest. The yields in bushels per acre are shown. The corn rootworm pressure in both fields was very low or absent. The results demonstrate that even if there is no corn rootworm pressure the fungal treatments provide at least the same yield as untreated seeds.

In summary, the treatment of seeds or soil with either BF503 or BF517 alone with no other components is demonstrated to provide many benefits to corn production. Treatment of either the seeds or the surrounding soil with either fungal species alone in the absence of any other treatments was shown to be beneficial. For the treatment of seeds according to the present invention each of the fungi are preferably applied in an amount of from $10^3$ to $10^6$ CFU per seed, more preferably at a level of $10^4$ to $10^5$ CFU per seed. In terms of soil treatment, the data in the present specification was tested using a level of $10^6$ CFU per gram of soil in the greenhouse experiments. It is believed that effective field soil treatment will comprise an in furrow method of application of the fungi to the planted seeds meaning the fungi will be deposited next to or proximate to the seeds and the area directly around the seeds, this area is also known as the seed zone. In furrow application methods are well known in the art and commonly used. The method will comprise applying the fungi in furrow proximate to the planted seeds at a level of from $10^3$ to $10^6$ CFU of each fungus per seed directly into the seed zone closely adjacent to the planted seeds, more preferably application at a level of from $10^4$ to $10^5$ CFU per seed of each fungus. Both fungi, BF503 and BF517, were able to kill corn rootworm larvae and reduce the number of emerging beetles. Both were able to increase corn production in the presence of no CRW or in the presence of CRW. Both were capable of working with both conventional corn seeds and with Bt (mCry3A) seeds to increase production. It is believed that the fungi treatments according to the present disclosure can be applied to any variety of corn, whether genetically modified or not. In addition, at least BF517 was able to actually increase dry root weight in a greenhouse experiment. The data clearly demonstrates the benefits of using either BF503 or BF517 either alone or in combination with SabrEx® for corn to prevent and control corn rootworm. When a combination of BF503 or BF517 with the SabrEx® for corn is used the process can either comprise applying all the fungi to the seed or in furrow at the same time or by separate application treatments of the BF503 or BF517 plus the SabrEx® for corn.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

I claim:

1. A method for reducing corn rootworm damage to corn plants comprising the step of:
   applying to a plurality of corn seeds at least one fungus selected from the group consisting of *Beauveria bassiana* strain ARSEF 2579, *Metarhizium pingshaence* strain ARSEF 5197 and mixtures thereof, with each selected fungus applied at a level of from $10^3$ to $10^6$ colony forming units per seed.

2. The method according to claim 1 comprising the further step of planting the plurality of corn seeds.

3. The method according to claim 1 comprising the further step of additionally applying to the plurality of corn seeds from $10^3$ to $10^6$ colony forming units of *Trichoderma afroharzianum* species K2 (ATCC PTA-9708) and from $10^3$ to $10^6$ colony forming units of *Trichoderma atroviride* species K4 (ATCC PTA-9707).

4. The method according to claim 3 comprising the further step of planting the plurality of corn seeds.

5. A method for reducing corn rootworm damage to corn plants comprising the step of:
   applying to a field planted with corn plants at least one fungus selected from the group consisting of *Beauveria bassiana* strain ARSEF 2579, *Metarhizium pingshaence* strain ARSEF 5197 and mixtures thereof, the selected fungus applied into the seed zone of each corn plant at a level of from $10^3$ to $10^6$ colony forming units per corn plant.

6. The method according to claim 5 comprising the further step of additionally applying to the field planted with corn plants *Trichoderma afroharzianum* species K2 (ATCC PTA-9708) and *Trichoderma atroviride* species K4 (ATCC PTA-9707), each fungus applied into the seed zone of each corn plant at a level of from $10^3$ to $10^6$ colony forming units per corn plant.

7. The method according to claim 5 wherein the step of applying the at least one fungus is done when the corn plants reach a stage of V3 or later.

8. The method according to claim 7 comprising the further step of additionally applying to the field planted with corn plants *Trichoderma afroharzianum* species K2 (ATCC PTA-9708) and *Trichoderma atroviride* species K4 (ATCC PTA-9707), each fungus applied into the seed zone of each corn plant at a level of from $10^3$ to $10^6$ colony forming units per corn plant when the corn plants reach a stage of V3 or later.

\* \* \* \* \*